June 22, 1954
C. B. RICHEY ET AL
2,681,541
SNAPPING ROLL AND GATHERING CHAIN
ARRANGEMENT FOR CORN PICKERS
Filed Aug. 30, 1951
2 Sheets-Sheet 1
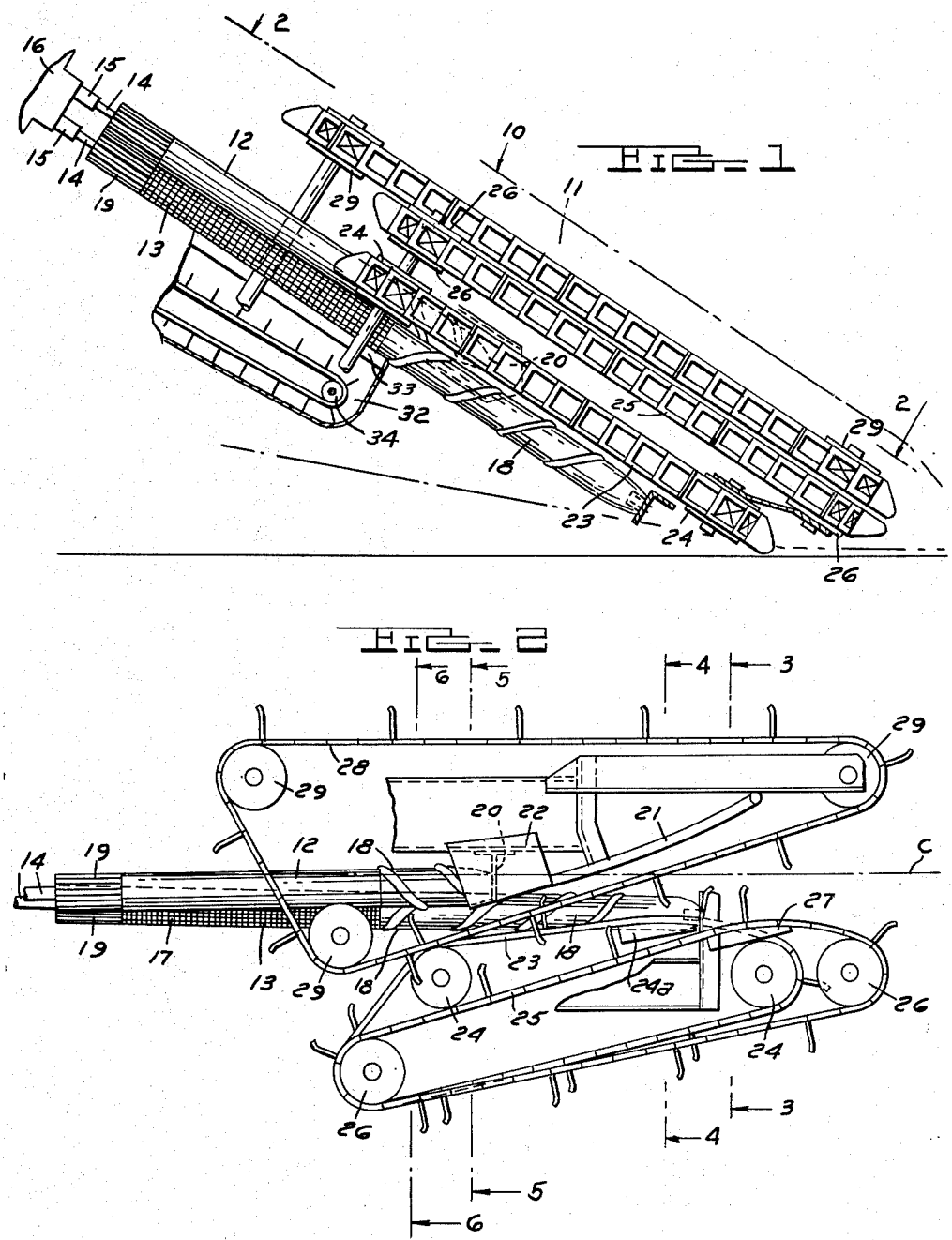
INVENTORS
CLARENCE B. RICHEY
BY JOHN F. O'DONNELL
ATTORNEY

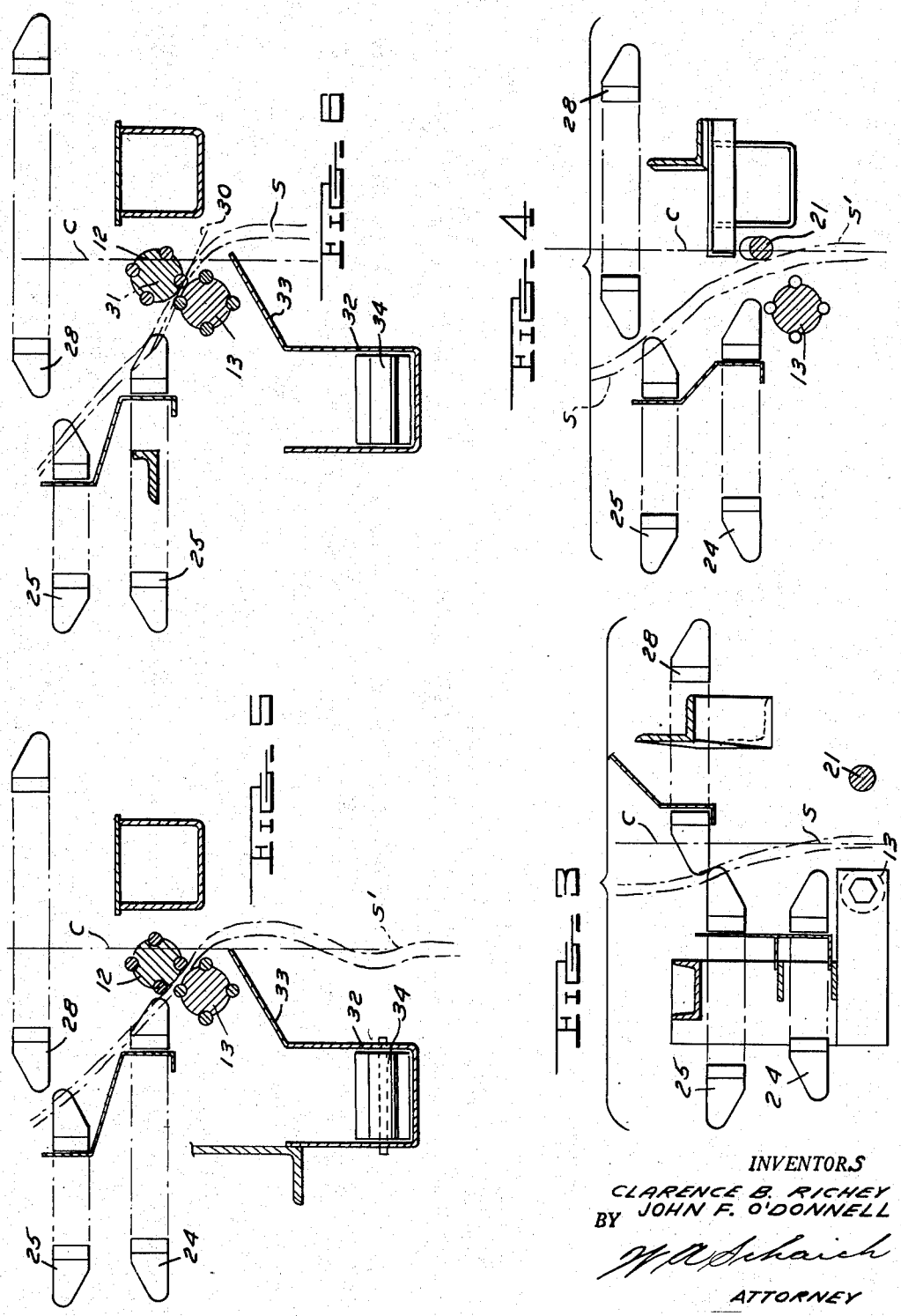

Patented June 22, 1954

2,681,541

UNITED STATES PATENT OFFICE 2,681,541

SNAPPING ROLL AND GATHERING CHAIN ARRANGEMENT FOR CORN PICKERS

Clarence B. Richey, Royal Oak, and John F. O'Donnell, Utica, Mich., assignors to Ford Motor Company, Dearborn, Mich., a corporation of Delaware Application August 30, 1951, Serial No. 244,302

7 Claims. (Cl. 56—111)

The present invention relates to a corn harvesting machine provided with vertically disposed snapping rolls defining a generally lateral snapping nip therebetween and with means for preventing premature passage of a corn stalk through the lateral snapping nip to increase the harvesting efficiency of the machine.

This invention is primarily concerned with means for increasing the snapping efficiency and lowering shelled corn losses in a corn picker having counter-rotating, forwardly divergent snapping rolls through which a corn stalk is pulled, the corn ears being snapped from the stalk by contact of the ears with the rolls. Although the prior art has suggested the vertical displacement of the rolls from their conventional horizontal positions to define a roll nip through which the stalks pass in a generally lateral plane, such constructions have not been satisfactory since the lateral distance between the vertically canted rolls is effectively decreased and the rolls tend to pull the stalks through the rolls before the gap between the rolls is sufficiently narrow to efficiently snap the ears from the stalks. Consequently, excessive shelling of corn from the ears has resulted, since the roll-ear contact time is increased and the ears are snapped from the stalks by the rolls ahead of the designed roll snapping regions, so that the ears contact the aggresive stalk-pulling sections of the rolls, rather than the less aggressive ear-snapping roll region.

In the present invention, forwardly divergent snapping rolls are utilized, the rolls being of unequal length with the shorter of the rolls terminating at the rear of a fixed forwardly extending guide member. This fixed guide member co-acts with the other of the rolls to guide corn stalks between the snapping rolls, while premature pulling of the stalk through the rolls, as in conventional corn pickers, is prevented. In addition to being forwardly divergent, the rolls are vertically displaced from one another, so that the rear convergent sections of the rolls provide a generally lateral roll nip through which the corn stalk must pass in a substantially horizontal plane. In this manner, ears snapped from the rolls in the lateral nip fall freely from the nip under gravity without interference from the stalk or from the rolls.

To more accurately guide the stalks through the substantially lateral nip, the stalk gathering chains are laterally displaced from the roll nip, so that the co-action of the chains lays the upper portion of the stalk over into substantial lateral alignment with the nip. In this manner, the stalk is conditioned for lateral entry into the snapping nip and the stalk passes through the rolls in a plane approximately perpendicular to a line joining the axis of the rolls, thereby avoiding premature pulling of the stalk through the vertically displaced rolls, i. e., before the roll gap is sufficiently narrow to adequately snap the ears from the stalk. In addition, the lateral deflection of the stalk makes possible the insertion of a gathering pan or like receptacle beneath the rolls to receive the ears snapped at the nip and to catch incidently shelled corn kernels.

Thus, it is an important object of the present invention to provide means for preventing the premature passage of corn stalks through a lateral snapping nip.

It is an additional object of the present invention to provide an improved corn harvester having means for laterally deflecting a corn stalk for subsequent passage through a substantially horizontal snapping zone.

Another important object of the present invention is the provision of an improved gathering chain and snapping roll arrangement for the corn picker whereby effective snapping of the corn ears from a stalk is accomplished at a lateral snapping nip with the stalks being previously deflected for passage through the nip.

It is a further object to provide a corn picker in which forwardly divergent snapping rolls are substantially vertically aligned at the roll snapping nip and in which the stalk gathering chains are laterally offset from the rolls at the snapping nip to condition the stalk for entry into the snapping nip.

Still another important object is the provision of a corn harvesting machine having co-operable forwardly divergent snapping rolls, one of which terminates in spaced relationship to the forward end of the other of the rolls, and a stationary forwardly and laterally projecting guide for co-operation with the longer of the rolls to guide corn stalks therebetween.

It is yet another object of the present invention to provide a pair of forwardly divergent snapping rolls for a corn picker, the rolls defining therebetween a substantially horizontal snapping nip at the rear portions thereof, and a snapped ear and shelled corn receiving means underlying the roll snapping nip and adapted to receive material therefrom.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary elevational view of a snapping roll and gathering chain arrangement of the present invention with parts in section;

Figure 2 is a plan elevational view of the arrangement of Figure 1;

Figure 3 is a diagrammatic sectional view taken along the plane 3—3 of Figure 2;

Figure 4 is a diagrammatic sectional view taken along the plane 4—4 of Figure 2;

Figure 5 is a diagrammatic sectional view taken along the plane 5—5 of Figure 2; and Figure 6 is a diagrammatic sectional view taken along the plane 6—6 of Figure 2.

As shown on the drawings:

In Figure 1, reference numeral 10 refers generally to a snapping roll and gathering chain arrangement of the present invention housed within the flare sheets 11 of a corn picking machine. It is, of course, understood that the snapping roll and gathering chain arrangement is utilized in connection with the remainder of a corn picking apparatus including a frame adapted to be mounted upon or pulled by a prime mover such as a farm tractor or the like, a drive mechanism for driving the rolls and chains, and elevators or similar conveyors for conveying snapped corn to a suitable receptacle or to a husking bed, if such is employed. However, the present invention is concerned only with the snapping roll and gathering chain arrangement which is applicable for use with various types of corn harvesting machinery.

More specifically, the arrangement indicated at 10 comprises a pair of corn snapping rolls 12 and 13. The rolls 12 and 13 are forwardly divergent, as is usual in this type of roll arrangement, and the rolls are driven for counterrotation by separate axially rearwardly extending driving shafts 14 coupled, as at 15, to a suitable drive mechanism, such as a gear box 16. The rolls 12 and 13 are not only forwardly divergent, but are vertically canted so that the upper roll 12 overlies the lower roll 13 adjacent the upper portions thereof, as best illustrated in Figures 5 and 6. The upper portions of the roll 13 is knurled as at 17 to provide an ear snapping nip at which the ears are snapped from the associated corn stalk. Forwardly of the knurled surface portion 17 of the roll, the rolls are provided with aggressive peripheral spiral sections 18 having a substantial axial lead so as to force corn stalks rearwardly therebetween. The extreme rear portions of the rolls are axially fluted, as at 19, so as to provide an extremely aggressive section at the rear of the rolls for grabbing the stalks and forcing the same downwardly therebetween to aid in clearing the machine of stalks.

It will be noted from Figures 1 and 2 that the upper roll 12 is substantially shorter than the lower roll 13. Immediately ahead of the end bearing 20 at the forward end of the short upper roll 12, there is positioned a stationary guide 21, preferably formed of smooth cylindrical or tubular stock. The forward portion of the guide 21 is laterally deflected from the longer roll 13 and the terminal end of the guide is deflected upwardly to improve ground and trash clearance. The stationary guide 21 cooperates with the forwardmost portion of the longer, lower roll 13 to aid in guiding corn stalks into snapping position between the rolls, and a shield 22 of sheet metal overlaps the rear extremity of the stationary guide 21 and the adjacent forward portion of the upper roll 12 to smoothly blend the members into one another, so as to prevent interference with stalk passage at this point.

The stationary guide 21 is of smooth outer contour, and there is no grabbing of the stalk by this guide member so that the guide merely serves to deflect any offcenter stalks into the space between the rolls 12 and 13. Since the guide has no stalk grabbing function, there is no tendency for the stalk to be forced downwardly at the forwardmost portions of the harvesting machine, even though the rear of the guide generally overlies the longer roll 13, thereby forestalling premature snapping of ears from the stalk.

To aid in guiding stalks into the nip of the roll, and to laterally deflect the stalks for more ready passage through the nip area 17 of the rolls, there are provided a plurality of gathering chains which extend forwardly of the rolls and rearwardly generally therealong to the nip area 17. The chains are of the conventional type having outwardly projecting link fingers, and the chains are each driven at a speed synchronized with the harvester ground speed. More specifically, a first or lower chain 23 is trained about spaced guide pulleys 24 and a guide block 24a to directly overlie the lower roll from its forwardmost portion 18 to substantially the juncture of the portion 18 and the roll nip portion 17. An intermediate chain 25 is provided to generally overlie the lower chain 23, the intermediate chain extending from a point in advance of the lower roll 13 to a point aligned with the forward portions of the roll snapping nip. However, it will be noted that the intermediate snapping chain follows a path which is angularly displaced from the axis of the roll 13, so that the upper reaches of the chain 25 are laterally inclined from the roll axis to lie on one side of the snapping nip. The intermediate chain 25 is guided in its path by a pair of guide pulleys 26 and a guide block 27.

In addition to the chains 23 and 25 hereinbefore described, there is provided an upper gathering chain 28 lapped about a plurality of guide pulleys 29 with the effective reach of the chain, i. e., that portion of the chain overlying the rolls 12 and 13, being substantially parallel with the corresponding adjacent reach of the intermediate chain 25.

The relative positions of the guide chains, the rolls 12 and 13, and the stationary guide 21 along the longitudinal plane of the harvester are illustrated in Figures 3–6, inclusive. For example, from Figure 3, it will be seen that the first contact of the harvester with the corn stalks occurs in the vicinity of the juncture of the chains 28 and 25, or more specifically, the point at which the link fingers of the chains come into proximity. This point is in advance of the roll 13 and stationary guide 21 with the chains guiding the stalks therebetween into alignment with the snapping nip 17.

In Figure 4, the relative positions of the roll 13, the stationary guide 21 and the chains is shown at a point where the stalk has actually entered between the guide and the roll. It will be noted that the stalk S is laterally deflected above the roll 13 and the guide 21 by the chains 25 and 28. This lateral deflection occurs by virture of the inclination of the substantially parallel intermediate and upper chains with respect to the center line of the row of stalks indicated generally at C. This lateral deflection of the stalks is continued and becomes more pronounced as the stalks progress between the chains 25 and 28 and between the rolls 12 and 13. After the lower portion of the stalks enters the space between the rolls, the upper portions of the stalks remain in contact with the chains, so that the stalks are actually bent laterally about an effective fulcrum located at the nip between the rolls. In addition to this lateral deflection to which the stalk is subjected, the stalk is being pulled through the counterrotating rolls by the roll nip action, and the stalk is thus forced downwardly toward the ground so that the lower portion of the stalk may be buckled, as indicated at S' in Figure 5. This jamming of the stalk downwardly, together with the buckling of the stalk weakens the stalk so that lateral deflection is more easily carried out, and the passage of the stalk through the roll nip also aids in conditioning the stalk for more ready deflection.

The inclination of the rolls with respect to the ground, and the parallel inclination of the chains, is such that the height of the lowermost ear on the stalk is obtained in the vicinity of the plane upon which Figure 6 is taken, which plane coincides with or is slightly ahead of the knurled nip section of the rolls. From Figure 6, it will be seen that the inclination of the stalk at the snapping nip substantially coincides with a plane 30 perpendicular to a plane 31 joining the axes of the rolls 12 and 13. In other words, the stalk is aligned with the direction in which it must travel through the nip. Inasmuch as the stalk has been laterally deflected, and further since the stalk must pass through the lateral nip, it will be seen that ears contacting the rolls at or near the snapping zone will be readily snapped from the stalk. By virtue of the substantially horizontal or lateral nip, the snapped ears are free to fall vertically from the snapping nip without material interference from either the rolls or the stalk. In this manner, the time of contact of the ears with the rolls is minimized, and ear removal from the snapping zone is facilitated.

Ears falling from the snapping zone fall by gravity into a conveyor chute 32 generally underlying the rolls and having a lateral extension 33 directly underlying the rolls so as to guide the ears into the chute 32. Entry of the chute and the extension 33 thereof beneath the rolls is made possible by the lateral passage of the stalk through the roll nip, since the stalk does not extend vertically through the rolls. Thus, a space is provided underlying the rolls for mounting the conveyor chute 32. In order to remove the snapped ears from the chute 32 the chute is provided with the rearwardly running paddle conveyor 34. The snapped ears are picked up by the conveyor and moved rearwardly to a husking bed or to a suitable receptacle as desired.

It will, therefore, be seen that the present invention provides means for deflecting a corn stalk laterally to facilitate entry of the stalk through a lateral snapping zone. Several important advantages are obtained by this structure since snapped ears more readily fall from the snapping zone by gravity, the stalk is aligned with the snapping nip to prevent premature ear snapping, a snapped corn receptacle may be provided beneath the snapping rolls, and shelling of the snapped ears is reduced. In addition to these advantages, the present invention also provides means for guiding the corn stalks between the rolls without an aggressive roll action upon the stalks during their initial entry into the machine to further prevent premature ear snapping. This last advantage is obtained by the use of a divergent stationary guide in combination with a shortened roll.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a corn picker, a pair of counterrotating juxtapositioned snapping rolls having their forward ends laterally divergent and their rear ends substantially vertically displaced relative to one another to provide a restricted lateral snapping nip area adjacent the roll ends, and a pair of endless gathering chains having laterally adjacent rearwardly traveling flights generally overlying said rolls, at least one of said chains having a flight extending at an acute angle to the axis of at least one of said rolls in advance of said nip area to deflect a corn stalk laterally with respect to said rolls for more ready passage through said snapping area.

2. In a corn picker, a pair of counterrotating juxtapositioned snapping rolls having their forward ends laterally divergent and the rear end of one of said rolls overlying the rear end of the other of said rolls to define a lateral snapping nip, and a plurality of gathering chains extending along the length of said rolls including a lower chain generally parallel to the axis of and generally overlying the lower one of said rolls to aid in pulling stalks therealong and a plurality of upper chains, at least one of said upper chains having a flight overlying at least one of said rolls in advance of said nip and lying at an acute angle with respect to said one roll to deflect upper portions of a stalk into alignment with said nip for passage therethrough as a consequence of roll rotation.

3. In combination, a pair of forwardly divergent snapping rolls rotatable about individual inclined axes and the rear end of one of said rolls overlying the rear end of the others of said rolls to define a generally lateral snapping nip therebetween, and a gathering chain having a flight overlying the forward portion of at least one of said rolls at an acute angle to the axis of said one roll.

4. In combination, a pair of counterrotating forwardly divergent snapping rolls adapted to receive corn stalks therebetween with roll-stalk engagement forcing said stalks downwardly between the rolls, the rear end of one of said rolls overlying the rear end of the other of said rolls to define a generally lateral snapping nip therebetween, a stalk engaging chain having a flight overlying the forward portion of at least one of said rolls at an acute angle to the axis thereof for deflecting said stalks laterally to one side of the rolls into substantial alignment with said nip, and ear collecting means substantially underlying said other of said rolls to receive ears from said nip.

5. In combination, a pair of counterrotating forwardly divergent snapping rolls adapted to receive corn stalks therebetween, the rear end of one of said rolls overlying the rear end of the other of said rolls to define a lateral snapping nip at the rear portions thereof, stalk gathering chains generally overlying the rolls, one of said chains having a flight passing completely across at least one of said rolls to lie at an acute angle to the axis of said one roll for laterally displacing stalk portions engaged thereby into substantial alignment with said nip, and a snapped corn conveyor underlying said other of said rolls in the area of said nip to receive ears therefrom.

6. In combination, a pair of counterrotating forwardly divergent substantially cylindrical snapping rolls having peripheral stalk-engaging surface projections along substantially the entire length thereof, the rear end of one of said rolls overlying the rear end of the other of said rolls to define a generally lateral snapping nip, one of said rolls terminating ahead of said nip and substantially short of the forward end of the other of said rolls, a laterally deflected forwardly divergent non-rotatable fixed guide generally axially aligned with the shorter of said rolls and cooperating with the longer of said rolls to guide corn stalks therebetween, and stalk engaging means for deflecting said stalk laterally into substantial alignment with said snapping nip, said stalk engaging means overlying at least one of said rolls and said fixed guide and being laterally inclined with respect thereto to lie at an acute angle with respect to the axis of said one roll in advance of said nip, whereby said fixed guide and said stalk engaging means prevent premature passage of stalks through said rolls in advance of said nip, thereby confining snapping action to said nip.

7. In combination, a pair of snapping rolls having overlapping rear ends defining a generally lateral snapping nip, said rolls being of unequal length with the shorter top roll cooperating with the longer lower roll to define said nip therebetween, a fixed laterally deflected non-rotatable guide aligned with the forward end of said shorter upper roll for co-action with the lower roll to guide corn stalks therebetween, a plurality of gathering chains generally overlying said guide and said rolls, one of said chains extending at an acute angle to the axis of one of said rolls for deflecting stalks into substantial alignment with said nip prior to stalk passage therethrough, and a snapped corn conveyor generally underlying said lower roll in proximity to said nip to receive ears snapped from said stalks at said nip, said guide and said chains preventing premature pulling of stalks through said rolls, thereby confining snapping action to said nip, and the lateral nip and chain deflection of said stalks accommodating insertion of said conveyor beneath said lower roll.

References Cited in the file of this patent

UNITED STATES PATENTS

| Number | Name | Date |
|---|---|---|
| 787,750 | Goodhue | Apr. 18, 1905 |
| 976,223 | Small | Nov. 22, 1910 |
| 1,086,115 | Younger | Feb. 3, 1914 |
| 1,298,708 | Hermann | Apr. 1, 1919 |
| 1,706,823 | Rosenthal | Mar. 26, 1929 |
| 1,721,387 | Gayraud et al. | July 16, 1929 |
| 2,121,859 | Currie et al. | June 28, 1938 |
| 2,341,248 | Urschel | Feb. 8, 1944 |